US005721035A

United States Patent [19]

Dunn

[11] Patent Number: 5,721,035
[45] Date of Patent: Feb. 24, 1998

[54] FOAM STRUCTURE

[75] Inventor: Edwin Reed Dunn, Rocky Face, Ga.

[73] Assignee: The Goodyear Tire & Rubber Company, Akron, Ohio

[21] Appl. No.: 742,020

[22] Filed: Nov. 1, 1996

[51] Int. Cl.$^6$ ........................................ B32B 3/26
[52] U.S. Cl. .................. 428/95; 428/308.4; 428/320.2; 428/322.7; 428/333; 428/337; 428/339; 156/307.1; 156/307.5; 521/54; 521/904
[58] Field of Search .................... 521/54, 904; 428/95, 428/308.4, 322.7, 131, 320.2, 333, 337, 339; 156/307.1, 307.5

[56] References Cited

U.S. PATENT DOCUMENTS

| 4,098,944 | 7/1978 | Pollock | 428/308.4 X |
| 4,279,953 | 7/1981 | Barden et al. | 428/95 X |
| 4,957,798 | 9/1990 | Bogdany | 521/54 X |

FOREIGN PATENT DOCUMENTS

| 1335098 | 10/1973 | United Kingdom | 428/308.4 |

*Primary Examiner*—Fred Teskin
*Attorney, Agent, or Firm*—Alvin T. Rockhill

[57] ABSTRACT

The present invention is based upon the discovery that composite open-cell foam structures, such as carpet underlay cushions, having improved compression resistance and better wear characteristics can be manufactured by utilizing a carboxylated styrene-butadiene rubber latex which is comprised of a styrene-butadiene rubber latex and a carboxylated styrene-butadiene rubber latex. The subject invention more specifically discloses a carpet underlay cushion structure comprising: a carrier layer of open-cell, resilient polyurethane foam material, said resilient foam material being substantially completely and uniformly impregnated with a carboxylated styrene-butadiene rubber latex blend, wherein said carboxylated styrene-butadiene rubber latex blend is comprised of (a) about 70 weight percent to about 95 weight percent of a styrene-butadiene rubber latex and (b) from about 5 weight percent to about 30 weight percent of a carboxylated styrene-butadiene rubber latex; the impregnated foam material being dried after said impregnation to produce a foamed, open-cell, resilient composite cushion structure wherein the open cells thereof partially comprise said carrier layer of polyurethane foam material.

20 Claims, 3 Drawing Sheets

5,721,035

FOAM STRUCTURE

FIELD OF THE INVENTION

The present invention relates to open-cell resilient foam materials, and particularly to resilient foam materials for use as carpet cushion underlays.

BACKGROUND OF THE INVENTION

Polyurethane foams are cellular plastic materials which are normally produced by the reaction of long chain polyol compounds and organic polyisocyanates. Cellular plastics are available in various degrees of rigidity, ranging from soft, flexible foams useful in cushioning, clothing interliners, rug underlays, sponges and bath mats; semi-rigid foams, useful particularly as crash pads; and rigid foams for structural and insulation purposes. The final properties of the urethane foams depend principally on the choice of polyethers, polyesters or other long chain polyhydroxyl compounds which are converted by the polyisocyanate into a high molecular weight polymer which is then foamed by a suitable foaming system, usually a reaction of water with the free isocyanate content of the polymer, resulting in the formation of carbon dioxide which expands the resin into the desired cellular plastic.

The control of branching in the reactants permits an extremely wide range of properties in the final foamed plastic. The density of the foam is controlled to a great extent by the amount of water employed. The configuration of the cell depends principally on the equivalent weight of the long chain polyhydroxyl materials favoring the production of a closed cell structure and the higher equivalent weight polyhydroxyl materials leading to the open-cell structure. The degree of branching of the polyhydroxyl reactant also influences the cell character.

The flexible and semi-rigid foams are processed for the aforementioned applications in a manner such that the foam has a low density, usually from about 1.25 to 4 pounds per cubic foot, and preferably as low a density as is consistent with the provisions of a product of adequate strength, etc. Moreover, such flexible and semi-rigid foams should have an open-celled structure for most applications, which is to say that essentially all (i.e., at least about 90 percent), of the cells are intercommunicating since such a foam configuration is essential to the realization of acceptable foams for cushioning, clothing interliners, crash pads or the like. Rigid foams, in contradistinction, may have varying density values ranging up to 30 pounds per cubic foot or higher, and usually have a closed cell structure.

For certain applications, including padding utilized under carpet, however, it is often desired to utilize materials other than polyurethanes. Unfortunately, however, other polymer systems do not lend themselves readily to being formed into opencell, resilient structures. Generally, such structures are formed from latexes containing the desired polymer. The two most widely used procedures are the so-called Dunlap and Talalay foaming methods.

The Dunlap process utilizes a mechanical "foaming machine," e.g., the "Oakes" foamer or "Firestone" foamer whereby air is whipped into an aqueous latex compound (either styrene-butadiene rubber (SBR) and/or natural latex). Once frothed, a "gelling" agent (sodium silicon fluoride, potassium silicon fluoride and/or ammonium acetate) is introduced to cause the latex system to coagulate and assume a semi-solid (putty-like) consistency which can then be subjected to heat and allowed to cure in order to hold a desired shape. The Dunlap process will not produce a thick foam structure on a continuous basis. It is generally used to produce molded pieces of various thicknesses.

The Talalay method is much like the "Dunlap Process" except that, instead of using a chemical gelation, it freezes the foam by introducing carbon dioxide gas into the system to cause coagulation of the latex. Once coagulated, the normal curing takes place.

It is almost impossible, however, to produce large or continuous foamed materials by these methods higher than about 1 inch due to the fact that at the greater heights, the foam cells collapse causing uneven gauge and inferior physical properties.

The qualities of available polymers, however, such as the compression resistance and flexibility of the synthetic and natural rubbers, the fire-retardant properties of polyvinyl Chloride, etc, make these systems very desirable for specific applications, e.g., padding materials, especially carpet padding or cushion underlay.

Several prior patents disclose polyurethane foam materials being impregnated with various other compositions in order to obtain changes in particular characteristics of the polyurethane foam; however, none of these patents, discussed briefly below, provides an impregnated polyurethane foam structure having improved properties which are particularly useful as an improved padding or cushion underlay material for use under carpet.

U.S. Pat. No. 4,008,350, issued to Crawford et al, discloses an open-celled polyurethane foam impregnated with acrylic latices. The use described for this product is for a lining or padding material for use between the foot or leg and a ski boot. As indicated in the specification of that patent, the resinous acrylic latices retard the response of the foam to compressive stresses, and slow the tendency of the foam to recover to its original dimensions. As such, the product is not well suited for use as a carpet cushion underlay.

U.S. Pat. No. 4,169,184, issued to Pufahl, discloses a pressure sensitive adhesive structure. The polyurethane foam disclosed therein is to some extent (approximately 40 percent) open-celled, but it is a high density polyurethane, ranging from between 20–60 lbs/ft$^3$. The end product is made from this high density base foam having a thickness in the range of 15–35 mils, and is impregnated with a polychloroprene (neoprene) latex. Such a product would not yield a useful material for a carpet cushion underlay material.

U.S. Pat. No. 4,288,559, issued to Illger et al discloses the use of a foam material, preferably a polyurethane foam, impregnated with a dispersion of aluminum hydroxide, polyurethane latex and mixing stabilizers. The end product in this patent is touted as providing a foam material having increased flame resistance without impairment of the mechanical properties of the foam. As indicated previously, polyurethane foam has shortcomings in several respects for use as a carpet cushion underlay.

U.S. Pat. Nos. 4,547,526 and 4,455,396, issued to Al-Tabaqchali et al disclose a polyurethane foam impregnated with an aqueous dispersion of an acrylate and a flame protection agent which includes an aluminum trihydrate. Like the Illeger et al patent discussed above, the products disclosed are directed to providing increased resistance to flame without impairment of the original mechanical properties of the foam. The use of an acrylate in the impregnant is indicated as providing better resistance to aging than a polychloroprene latex would provide.

U.S. Pat. No. 4,239,571, issued to Cobb, is directed to a polyurethane foam which is impregnated with a liquid thermosetting resin which is cured while the foam is in compression. The resulting structure is not open-celled and is not sufficiently resilient for use as a carpet cushion underlay.

U.S. Pat. No. 4,224,374, issued to Priest, discloses a polyurethane foam substrate impregnated with a carboxylated neoprene latex mixture having alumina trihydrate included for increased fire resistance. Like the products disclosed in the Illger et al and Al-Tabaqchali et al patents, the object of impregnating the foam is to impart fire or flame resistance to the foam without affecting or impairing the mechanical properties of the substrate.

U.S. Pat. No. 4,260,688, issued to Simon, discloses yet another approach to flame-proofing a polyurethane foam without disturbing the physical properties of the foamed plastic. This patent discloses an impregnant including a carboxylated vinylidene-butadiene copolymer and aqueous ammoniacal combinations of benzene-phosphoric acid and melamine salts.

U.S. Pat. No. 4,042,746, issued to Hofer, discloses a multilayered composite structure having a rigid foam core member. One or more open-celled, initially resilient polyurethane foam layers are impregnated with a thermosetting or polymerizable liquid resin which is cured under compression with the rigid foam core at the center and a reinforcing fiberglass layer laminated at an outer surface. The resulting structure is not resilient and, in that respect, it could not be used as a padding or cushion material for carpet.

U.S. Pat. No. 4,279,953, issued to Barden et al, discloses a heat-resistant product for use between an automobile floorboard and the floor carpeting in the automobile. This product is not intended to be used as a cushion or padding, nor would it perform particularly well in such service. This patent teaches the use of carboxylated styrene-butadiene rubber (SBR) as an impregnating material, and only the outer surface portions of a polyurethane foam are impregnated. Carboxylated SBR imparts little or no resiliency to the final product, and the less than complete impregnation of the polyurethane foam provides no substantial improvement in resiliency of the foam.

U.S. Pat. No. 4,957,798, issued to Bogdany, discloses a carpet underlay cushion structure comprising: a carrier layer of open-cell, resilient polyurethane foam material, said resilient foam material being substantially completely and uniformly impregnated with a latex containing a polymer wherein said polymer is selected from the group consisting of non-carboxylated styrene-butadiene rubber, natural rubber and a combination of styrene-butadiene rubber and natural rubbers; the impregnated foam material being dried after said impregnation to produce a foamed, open-cell, resilient composite cushion structure wherein the open cells thereof partially comprise said carrier layer of polyurethane foam material. The carpet underlay cushion structures described by Bogdany have generally good physical characteristics. However, there is a desire in the industry to improve the compression resistance and wear characteristics of such carpet underlay cushion structures.

SUMMARY OF THE INVENTION

This invention is based upon the discovery that composite open-cell foam structures, such as carpet underlay cushions, having improved compression resistance and better wear characteristics can be manufactured by utilizing a carboxylated styrene-butadiene rubber latex which is comprised of (a) about 70 weight percent to about 95 weight percent of a styrene-butadiene rubber latex and (b) from about 5 weight percent to about 30 weight percent of a carboxylated styrene-butadiene rubber latex. The use of such a carboxylated styrene-butadiene rubber latex blend also offers the advantage of better filler bonding. Faster cure rates can also be achieved in manufacturing processes where the polyurethane foam is impregnated with the latex blends of this invention.

The subject invention more specifically discloses a carpet underlay cushion structure comprising: a carrier layer of open-cell, resilient polyurethane foam material, said resilient foam material being substantially completely and uniformly impregnated with a carboxylated styrene-butadiene rubber latex blend, wherein said carboxylated styrene-butadiene rubber latex blend is comprised of (a) about 70 weight percent to about 95 weight percent of a styrene-butadiene rubber latex and (b) from about 5 weight percent to about 30 weight percent of a carboxylated styrene-butadiene rubber latex; the impregnated foam material being dried after said impregnation to produce a foamed, open-cell, resilient composite cushion structure wherein the open cells thereof partially comprise said carrier layer of polyurethane foam material.

The present invention further discloses a method for manufacturing a carpet underlay cushion structure which comprises: (1) impregnating a carrier layer of open-cell, resilient polyurethane foam material with a carboxylated styrene-butadiene rubber latex blend, wherein said carboxylated styrene-butadiene rubber latex blend is comprised of (a) about 70 weight percent to about 95 weight percent of a styrene-butadiene rubber latex and (b) from about 5 weight percent to about 30 weight percent of a carboxylated styrene-butadiene rubber latex; (2) pressing a substrate made of a woven material onto a surface of said carrier layer; and (3) drying and curing said latex blend to produce a foamed open-cell, resilient polymer structure wherein the open cells thereof partially comprise said foam material.

DETAILED DESCRIPTION OF THE INVENTION

The procedure described in U.S. Pat. No. 4,957,798 is used in the practice of this invention except for the fact that a carboxylated styrene-butadiene rubber blend is substituted for the latex utilized therein. The teachings of U.S. Pat. No. 4,957,798 are accordingly incorporated herein by reference in their entirety.

Figure 1:
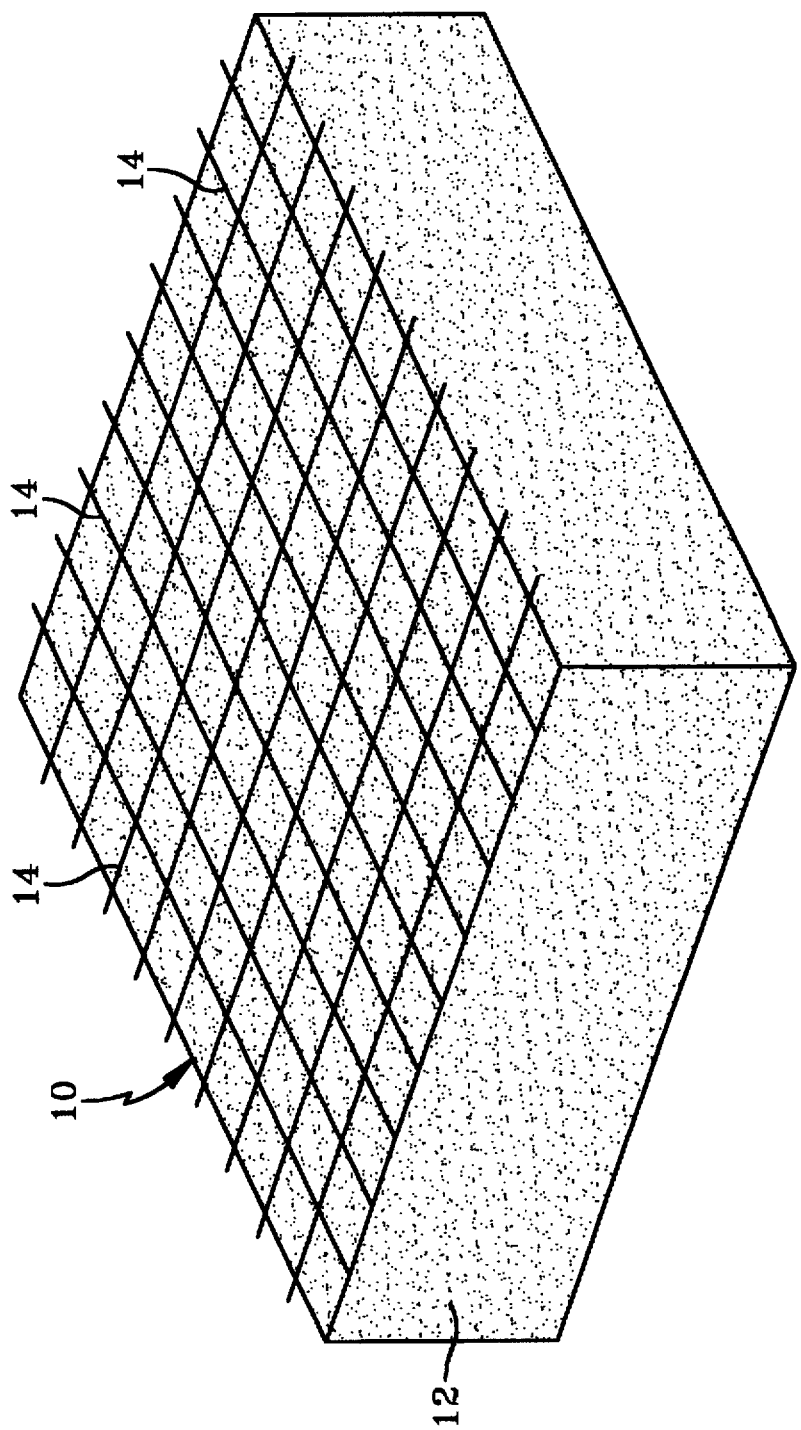
FIG. 1 is an elevational view of a carpet cushion structure of the invention.

Referring initially to FIG. 1, a composite carpet padding structure according to the present invention is indicated generally as numeral 10. Carpet padding structure 10 preferably comprises a carrier layer or base foam material 12 which is a conventional, low-density, open-celled, resilient foamed polyurethane (either polyester or polyether), and most preferably the foam has a density of less than about 1.5 lb/cubic feet (24 kilograms per cubic meter).

The base foam material 12 is typically about ¼ inch (6.3 mm) to about ½ inch (12.7 mm) thick and is impregnated with a carboxylated latex composition which is comprised of the carboxylated styrene-butadiene rubber latex blend of this invention, standard fillers (for example, mineral fillers, calcium carbonates, alumina hydrate, barytes, limestone and talc) and curing agents. The carboxylated latex composition can also optionally contain coloring agents, antidegradants, antifungal agents and antibacterial agents.

The carboxylated styrene-butadiene rubber latex blend can be made by simply mixing together a standard styrene-butadiene rubber latex and a carboxylated styrene-butadiene rubber latex. The carboxylated styrene-butadiene rubber latex blend is comprised of (a) about 70 weight percent to about 95 weight percent of the standard styrene-butadiene rubber latex and (b) from about 5 weight percent to about 30 weight percent of the carboxylated styrene-butadiene rubber latex. The carboxylated styrene-butadiene rubber latex blend will typically be comprised of about 75 weight percent to about 92 weight percent of the standard styrene-butadiene rubber latex and from about 8 weight percent to about 25 weight percent of the carboxylated styrene-butadiene rubber latex. The carboxylated styrene-butadiene rubber latex blend will preferably be comprised of about 80 weight percent to about 90 weight percent of the standard styrene-butadiene rubber latex and from about 10 weight percent to about 20 weight percent of the carboxylated styrene-butadiene rubber latex. The carboxylated styrene-butadiene rubber latex blend will more preferably be comprised of about 82 weight percent to about 88 weight percent of the standard styrene-butadiene rubber latex and from about 12 weight percent to about 18 weight percent of the carboxylated styrene-butadiene rubber latex.

The styrene-butadiene rubber in the standard styrene-butadiene rubber latex will normally contain from about 65 weight percent to about 90 weight percent 1,3-butadiene and from about 10 weight percent to about 35 weight percent styrene. The styrene-butadiene rubber in the standard styrene-butadiene rubber latex will preferably contain from about 70 weight percent to about 85 weight percent 1,3-butadiene and from about 15 weight percent to about 30 weight percent styrene. The styrene-butadiene rubber in the standard styrene-butadiene rubber latex will most preferably contain from about 75 weight percent to about 80 weight percent 1,3-butadiene and from about 20 weight percent to about 25 weight percent styrene. A standard styrene-butadiene rubber latex which can be used in making the latex blends of this invention is sold by The Goodyear Tire & Rubber Company as Pliolite® 5356 styrene-butadiene latex.

The carboxylated styrene-butadiene rubber in the carboxylated styrene-butadiene rubber latex utilized in making the latex blend will normally be comprised of about 55 weight percent to about 75 weight percent styrene, about 24 weight percent to about 44 weight percent 1,3-butadiene, and from about 0.5 weight percent to about 5 weight percent iraconic acid. The carboxylated styrene-butadiene rubber in the carboxylated styrene-butadiene rubber latex will preferably be comprised of about 60 weight percent to about 68 weight percent styrene, about 30 weight percent to about 39 weight percent 1,3-butadiene, and from about 1 weight percent to about 3 weight percent iraconic acid. The carboxylated styrene-butadiene rubber in the carboxylated styrene-butadiene rubber latex will most preferably be comprised of about 62 weight percent to about 66 weight percent styrene, about 32 weight percent to about 36 weight percent 1,3-butadiene, and from about 1.5 weight percent to 10 about 2 weight percent iraconic acid.

The base foam material 12 is preferably impregnated with the carboxylated latex blend composition by using a reverse roll applicator. In any case, the carboxylated latex blend composition is substantially completely impregnated or distributed throughout the foamed material. When used to impregnate a low density, open-celled polyurethane foam, the rubber blend yields a cushion structure which is especially well-suited for use as a carpet padding due to its mechanical properties, such as improved compression resistance, resilience and resistance to shear force or tearing. Instead of retaining the physical properties of base foam, the impregnated foam takes on mechanical properties which approximate those of a foamed product made of the rubber blend contained in the latex. Thus, the foam base material 12 may be considered to be a "carrier" for the rubber latex, providing a matrix around which the latex may be dried into final form and cured.

The composite carpet cushion structure 10 also preferably has at least one substrate layer 14 laminated thereto in the manufacturing process. Substrate 14 may be made of one of several types of suitable material and is preferably a woven scrim of the type conventionally used as a primary backing for tufted carpet. The substrate normally has a thickness of only about ½ mil (0.0127 mm). One suitable substrate is manufactured by Amoco and sold under the registered trademark "Action-Bac." Other woven, non-woven or porous sheet materials may also be suitable for use as the substrate, examples of which include acrylics, polypropylene, nylon, cellulose of jute, having a density of approximately one-half to 4 ounces per square yard. The substrate 14 serves to further improve the mechanical properties of the impregnated foam structure, providing increased dimensional stability, improved distribution of compressive forces over a wider area and further improves resistance to tearing of the padding material. The latter of these is especially important in carpet padding which is to be secured to a flooring surface with adhesive. The improved resistance to tearing evidenced in the padding of the present invention facilitates the complete removal of such padding (e.g., for replacement) with reduced chances that the padding will tear at the locations where the padding has been adhered to the flooring surface. Substrates may be used on both the upper and lower surfaces of the carpet cushion structure 10, to provide a lower surface for bonding to the flooring and an upper surface facilitating the ability of the carpet to slide across the surface.

Figure 2:
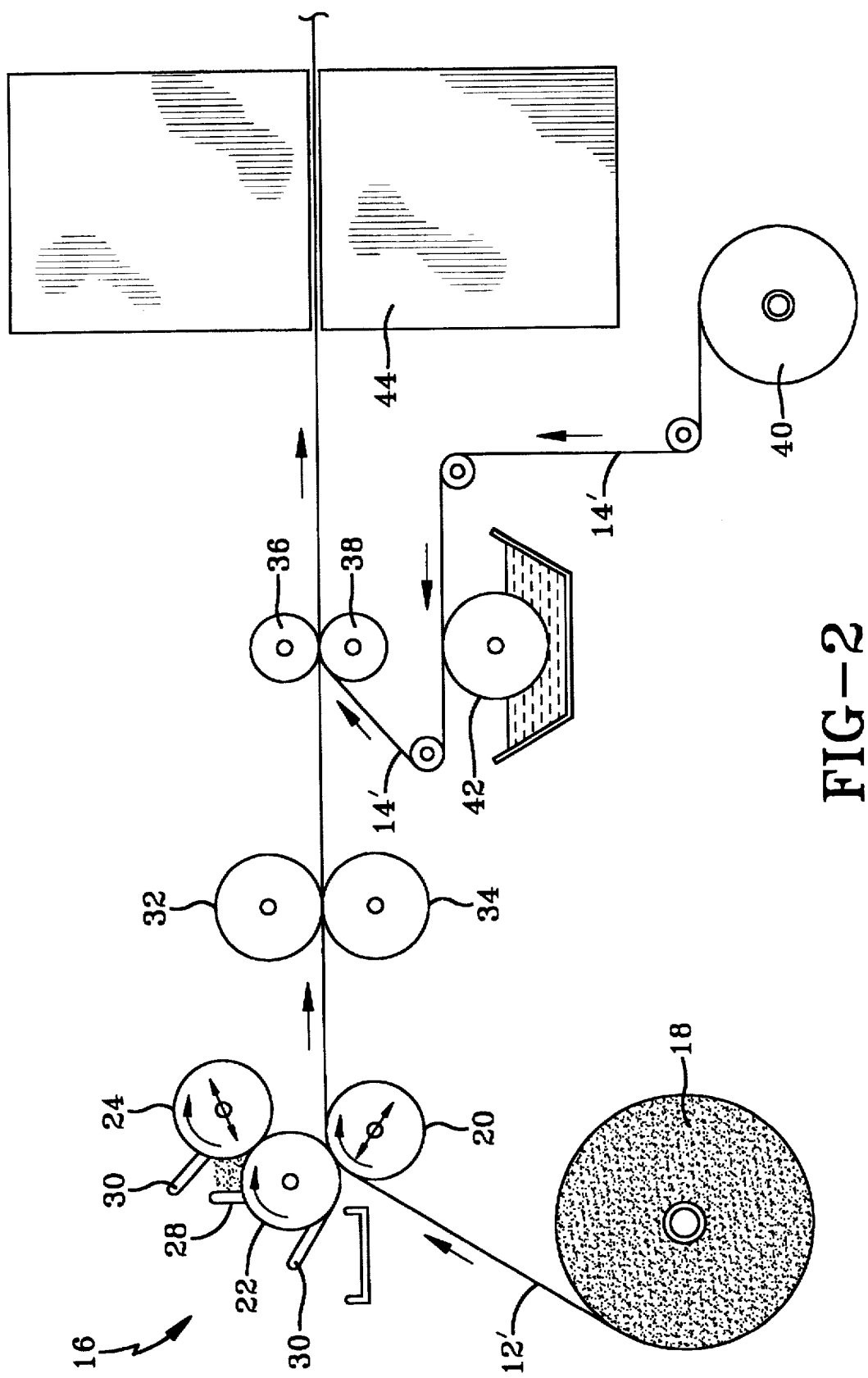
FIG. 2 is a side elevational view of an apparatus designed to produce a carpet cushion structure in accordance with the present invention.

Referring now to FIG. 2, a substantially diagrammatic side elevation view is depicted of an apparatus 16 used to produce the composite carpet padding structure of the present invention. The latex blend is preferably applied in the present invention using a reverse roll applicator. The open-celled polyurethane foam base material 12' is fed from a roll 18 over rubber backing roll 20. Transfer roll 22 and metering roll 24 coact to load transfer roll 22 with a predetermined amount of the polymer latex 26 from coating dam 28, the carboxylated rubber latex blend being applied to the polyurethane foam 12' as the foam passes through a nip between transfer roll 22 and rubber backing roll 20. Both transfer roll 22 and metering roll 24 are provided with doctor blades 30 which act to prevent excessive buildup of the latex blend. It is to be noted with respect to FIG. 2 that the arrows are included to indicate direction of travel of the sheets and rollers.

After the latex blend has been applied to the polyurethane foam material, the sheet 12' is passed between a pair of squeeze rolls 32, 34 which compress the foam and force the latex to fully penetrate and impregnate the entire thickness of the foam sheet 12'. The foam sheet is then passed, prior to the drying stage, between a pair of laminating rolls 36, 38 at which point a laminate substrate 14' is contacted with the foam sheet on one surface thereof.

The laminate substrate 14' in itself fed from a roll 40, preferably across an adhesive applicator roll 42, and brought into contact with a lower surface of impregnated foam sheet 12' at laminating rolls 36, 38. The foam sheet and substrate are pressed together between rolls 36 and 38 and the latex blend which has not yet dried is pressed between the fibers of the substrate and the latex substantially coats the fibers as well. The composite carpet cushion structure is then passed through a heater 44 to evaporate the water from the latex blend in forming the final product.

It should be noted that, although the process is described as including the application of adhesive to the substrate prior to contacting the foam sheet material, the latex itself may provide sufficient bonding between the foam and the substrate for certain substrates and for certain anticipated uses. In these instances, the application of the adhesive to the substrate may be omitted.

Figure 3:
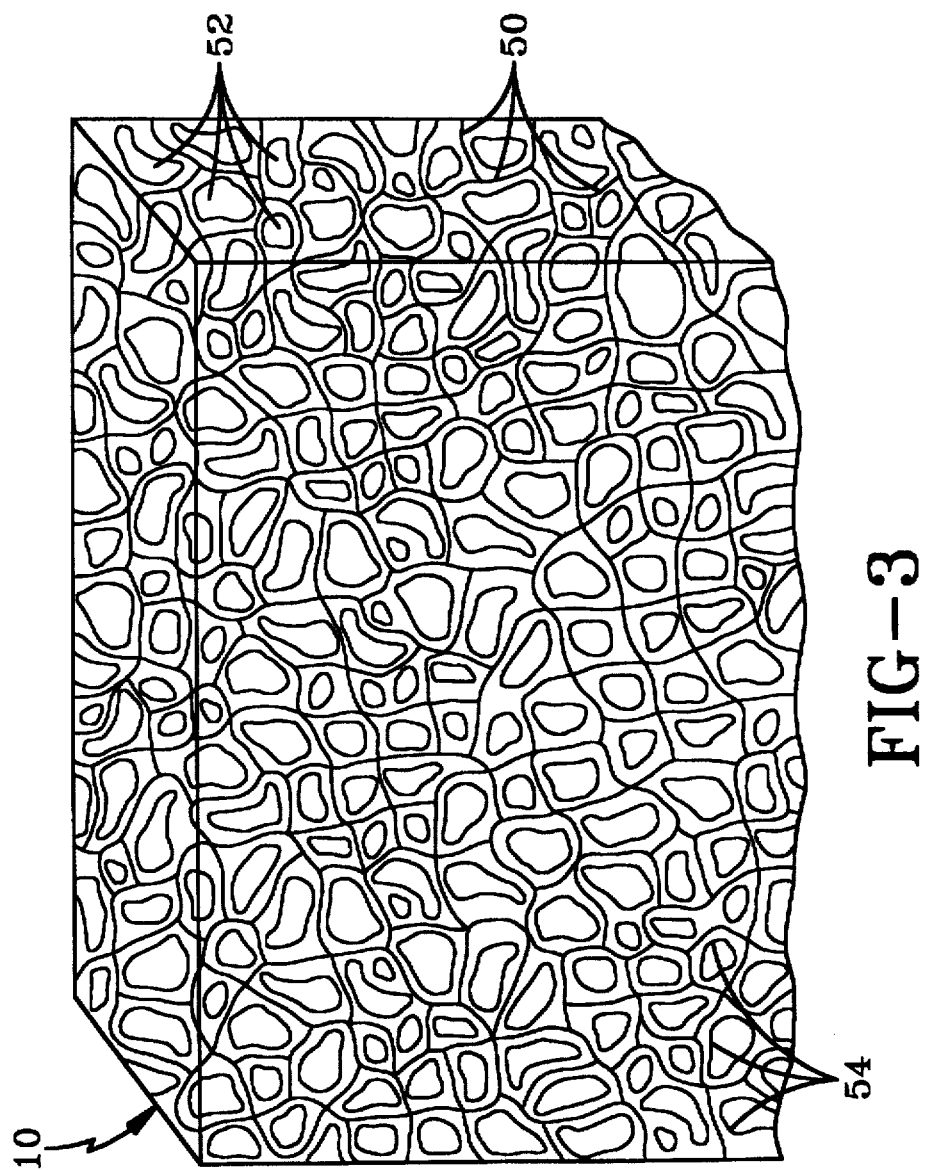
FIG. 3 is a cross-sectional view of a carpet cushion structure of the invention.

The impregnated foam portion of the end product 10 is shown in cross-section in FIG. 3. There it can be seen that the interior walls 50 of the open cells 52 of the foam are coated with the impregnant composition 54 according to the present invention. It will be understood by those skilled in the art that the composition of the fluid polymer may be adjusted to control the density of the final composite structure.

The composite carpet cushion product will normally employ a foam material 12 having a thickness in the range of about 60 mils (1.5 mm) to about 650 mils (16.5 mm). The foam material 12 will typically have a thickness in the range of about 250 mils (6.3 mm) to about 500 mils (12.7 mm). The foam material 12 will more typically have a thickness in the range of about 350 mils (8.9 mm) to about 400 mils (10.2 mm).

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLES 1-2

In this experiment, a carpet underlay cushion was made utilizing a carboxylated styrene-butadiene latex blend (Example 2) and compared to a carpet underlay cushion made with a standard styrene-butadiene latex (Example 1). In the procedure used, ⅜ inch (9.5 mm) thick polyurethane foam samples having a density of 4 ounces per square yard (136 g/m$^2$) were impregnated latex compositions made with each of the latex samples. The latex compositions contained a filler (calcium carbonate), an antioxidant and a curative as shown in Table I. Pliolite® 5356 styrene-butadiene latex was used as the standard styrene-butadiene latex. The styrene-butadiene rubber in the Pliolite® 5356 latex contained about 23 weight percent bound styrene and about 77 weight percent bound 1,3-butadiene. The latex blend which was utilized contained 85 percent Pliolite® 5356 styrene-butadiene latex and 15 percent carboxylated styrene-butadiene latex. The carboxylated styrene-butadiene rubber in the carboxylated styrene-butadiene latex contained about 64 percent styrene, about 34 percent 1,3-butadiene and about 2 percent itaconic acid.

The latex compositions were spread on the foam surfaces and the foam was then rolled with a metal bar to achieve a relatively uniform distribution of the latex compositions throughout the foam samples. The latex saturated foam samples were than dried and cured in an oven for 14 minutes at a temperature of 280° F. (138° C). Square samples which were 1.5 inches by 1.5 inches (3.81 cm×3.81 cm) in size were then die cut from the cured foam.

The cured samples were then weighed and tested to determine physical properties such as compression resistance and compression recovery. The blended latex samples of this invention provided better compression resistance and much better compression recovery than did the samples made utilizing standard styrene-butadiene latex. The latex composition recipes used and the physical properties which resulted are reported in Table I.

TABLE I

| | Example 1 | Example 2 |
|---|---|---|
| Pliolite ® 5356 SBR Latex | 143 parts | 121.6 parts |
| Carboxylated SBR Latex | 0 | 28.8 parts |
| Zinc Diethyldithiocarbamate | 2.5 parts | 2.5 parts |
| Zinc Mercaptobenzothiazole | 2.0 parts | 2.0 parts |
| Sulfur | 2.8 parts | 2.8 parts |
| Zinc Oxide | 5.0 parts | 5.0 parts |
| Wingstay L Antioxidant | 1.5 parts | 1.5 parts |
| Calcium Carbonate | 200 parts | 200 parts |
| Sample Weight, lbs/yd$^2$ | 2.297 | 2.319 |
| Compression Resistance @ 25% | 13,400 Pa | 15,800 Pa |
| Compression Resistance @ 50% | 20,700 Pa | 26,000 Pa |
| Compression Recovery[1] | 56.8% | 76.1% |

[1]Compression Recovery was measured after the samples had been held for 22 hours at 122° C.

Examples 3-4

The general procedure employed in Examples 1-2 was repeated in this experiment except for the fact that the latex compositions were compounded somewhat differently. The latex composition recipes used and the physical properties which resulted are reported in Table II.

TABLE II

| | Example 3 | Example 4 |
|---|---|---|
| Pliolite ® 5356 SBR Latex[1] | 100 parts | 85 parts |
| Carboxylated SBR Latex[1] | 0 | 15 parts |
| Zinc Diethyldithiocarbamate | 1.3 parts | 1.3 parts |
| Zinc Mercaptobenzothiazole | 1.0 parts | 1.0 parts |
| Sulfur | 2.0 parts | 2.0 parts |
| Zinc Oxide | 3.0 parts | 3.0 parts |
| Wingstay L Antioxidant | .75 parts | .75 parts |
| Calcium Carbonate | 200 parts | 200 parts |
| Sample Weight, lbs/yd$^2$ | 1.936 | 2.181 |
| Compression Resistance @ 25% | 11,100 Pa | 12,300 Pa |
| Compression Resistance @ 50% | 16,100 Pa | 19,800 Pa |
| Compression Recovery[2] | 64.5% | 74.5% |

[1]Based on the dry weight of the latex samples.
[2]Compression Recovery was measured after the samples had been held for 22 hours at 122° C.

While certain representative embodiments and details have been shown for the purpose of illustrating the subject invention, it will be apparent to those skilled in this art that various changes and modifications can be made therein without departing from the scope of the subject invention.

What is claimed is:

1. A carpet underlay cushion structure comprising: a carrier layer of open-cell, resilient polyurethane foam material, said resilient foam material being substantially completely and uniformly impregnated with a carboxylated styrene-butadiene rubber latex blend, wherein said carboxylated styrene-butadiene rubber latex blend is comprised of (a) about 70 weight percent to about 95 weight percent of a styrene-butadiene rubber latex and (b) from about 5 weight percent to about 30 weight percent of a carboxylated styrene-butadiene rubber latex; the impregnated foam material being dried after said impregnation to produce a foamed, open-cell, resilient composite cushion structure wherein the open cells thereof partially comprise said carrier layer of polyurethane foam material.

2. A method for manufacturing a carpet underlay cushion structure which comprises: (1) impregnating a carrier layer of open-cell, resilient polyurethane foam material with a carboxylated styrene-butadiene rubber latex blend, wherein said carboxylated styrene-butadiene rubber latex blend is comprised of (a) about 70 weight percent to about 95 weight percent of a styrene-butadiene rubber latex and (b) from about 5 weight percent to about 30 weight percent of a carboxylated styrene-butadiene rubber latex; (2) pressing a substrate made of a woven material onto a surface of said carrier layer; and (3) drying and curing said latex blend to produce a foamed open-cell, resilient polymer structure wherein the open cells thereof partially comprise said foam material.

3. A carpet underlay cushion structure as specified in claim 1 wherein said carboxylated styrene-butadiene rubber latex blend is comprised of about 75 weight percent to about 92 weight percent of the styrene-butadiene rubber latex and from about 8 weight percent to about 25 weight percent of the carboxylated styreneobutadiene rubber latex.

4. A carpet underlay cushion structure as specified in claim 3 wherein the styrene-butadiene rubber latex contains a styrene-butadiene rubber which contains from about 65 weight percent to about 90 weight percent 1,3-butadiene and from about 10 weight percent to about 35 percent styrene.

5. A carpet underlay cushion structure as specified in claim 4 wherein the carboxylated styrene-butadiene rubber latex contains a carboxylated styrene-butadiene rubber which contains from about 55 weight percent to about 75 weight percent styrene, from about 24 weight percent to about 44 weight percent 1,3-butadiene, and from about 0.5 weight percent to about 5 weight percent iraconic acid.

6. A carpet underlay cushion structure as specified in claim 5 wherein the carrier layer has a thickness which is within the range of about 80 mils to about 650 mils.

7. A carpet underlay cushion structure as specified in claim 6 wherein the carrier layer has an initial density of less than about 1.5 pounds per cubic foot.

8. A carpet underlay cushion structure as specified in claim 7 wherein said carboxylated styrene-butadiene rubber latex blend is comprised of about 80 weight percent to about 90 weight percent of the styrene-butadiene rubber latex and from about 10 weight percent to about 20 weight percent of the carboxylated styrene-butadiene rubber latex.

9. A carpet underlay cushion structure as specified in claim 8 wherein the styrene-butadiene rubber latex contains a styrene-butadiene rubber which contains from about 70 weight percent to about 85 weight percent 1,3-butadiene and from about 15 weight percent to about 30 weight percent styrene.

10. A carpet underlay cushion structure as specified in claim 9 wherein the carboxylated styrene-butadiene rubber latex contains a carboxylated styrene-butadiene rubber which contains from about 60 weight percent to about 68 weight percent styrene, from about 30 weight percent to about 39 weight percent 1,3-butadiene, and from about 1 weight percent to about 3 weight percent itaconic acid.

11. A carpet underlay cushion structure as specified in claim 7 wherein said carboxylated styrene-butadiene rubber latex blend is comprised of about 82 weight percent to about 88 weight percent of the styrene-butadiene rubber latex and from about 12 weight percent to about 18 weight percent of the carboxylated styrene-butadiene rubber latex.

12. A carpet underlay cushion structure as specified in claim 11 wherein the styrene-butadiene rubber latex contains a styrene-butadiene rubber which contains from about 75 weight percent to about 80 weight percent 1,3-butadiene and from about 20 weight percent to about 25 weight percent styrene.

13. A carpet underlay cushion structure as specified in claim 12 wherein the carboxylated styrene-butadiene rubber latex contains a carboxylated styrene-butadiene rubber which contains from about 60 weight percent to about 68 weight percent styrene, from about 30 weight percent to about 39 weight percent 1,3-butadiene, and from about 1 weight percent to about 3 weight percent itaconic acid.

14. A carpet underlay cushion structure as specified in claim 12 wherein the carboxylated styrene-butadiene rubber latex contains a carboxylated styrene-butadiene rubber which contains from about 62 weight percent to about 66 weight percent styrene, from about 32 weight percent to about 36 weight percent 1,3-butadiene, and from about 1.5 weight percent to about 2 weight percent iraconic acid.

15. A carpet underlay cushion structure as specified in claim 7 which further comprises a substrate securely adhered to said impregnated foam material, said substrate extending completely across at least one surface thereof.

16. A carpet underlay cushion structure as specified in claim 15 wherein said substrate is adhered to said foam material by an adhesive, said adhesive being component independent of said polymer latex.

17. A method for manufacturing a carpet underlay cushion structure as specified in claim 2 wherein said carboxylated styrene-butadiene rubber latex blend is comprised of about 75 weight percent to about 92 weight percent of the styrene-butadiene rubber latex and from about 8 weight percent to about 25 weight percent of the carboxylated styrene-butadiene rubber latex; wherein the styrene-butadiene rubber latex contains a styrene-butadiene rubber which contains from about 65 weight percent to about 90 weight percent 1,3-butadiene and from about 10 weight percent to about 35 percent styrene; and wherein the carboxylated styrene-butadiene rubber latex contains a carboxylated styrene-butadiene rubber which contains from about 55 weight percent to about 75 weight percent styrene, from about 24 weight percent to about 44 weight percent 1,3-butadiene, and from about 0.5 weight percent to about 5 weight percent iraconic acid.

18. A method for manufacturing a carpet underlay cushion structure as specified in claim 17 wherein said carboxylated styrene-butadiene rubber latex blend is further comprised of a filler and a curative.

19. A method for manufacturing a carpet underlay cushion structure as specified in claim 18 which further comprises applying an adhesive to said substrate prior to pressing said substrate onto said carrier layer.

20. A method for manufacturing a carpet underlay cushion structure as specified in claim 19 wherein said carrier layer is impregnated with said latex blend by application of said latex blend to said carrier layer by a reverse roll application followed by passing said carrier layer through a pair of squeeze rolls which compress said carrier layer by a predetermined amount.

\* \* \* \* \*